R. H. PEACOCK.
FRUIT GRADING APPARATUS.
APPLICATION FILED JAN. 19, 1912.
1,076,642.
Patented Oct. 21, 1913.
3 SHEETS—SHEET 1.
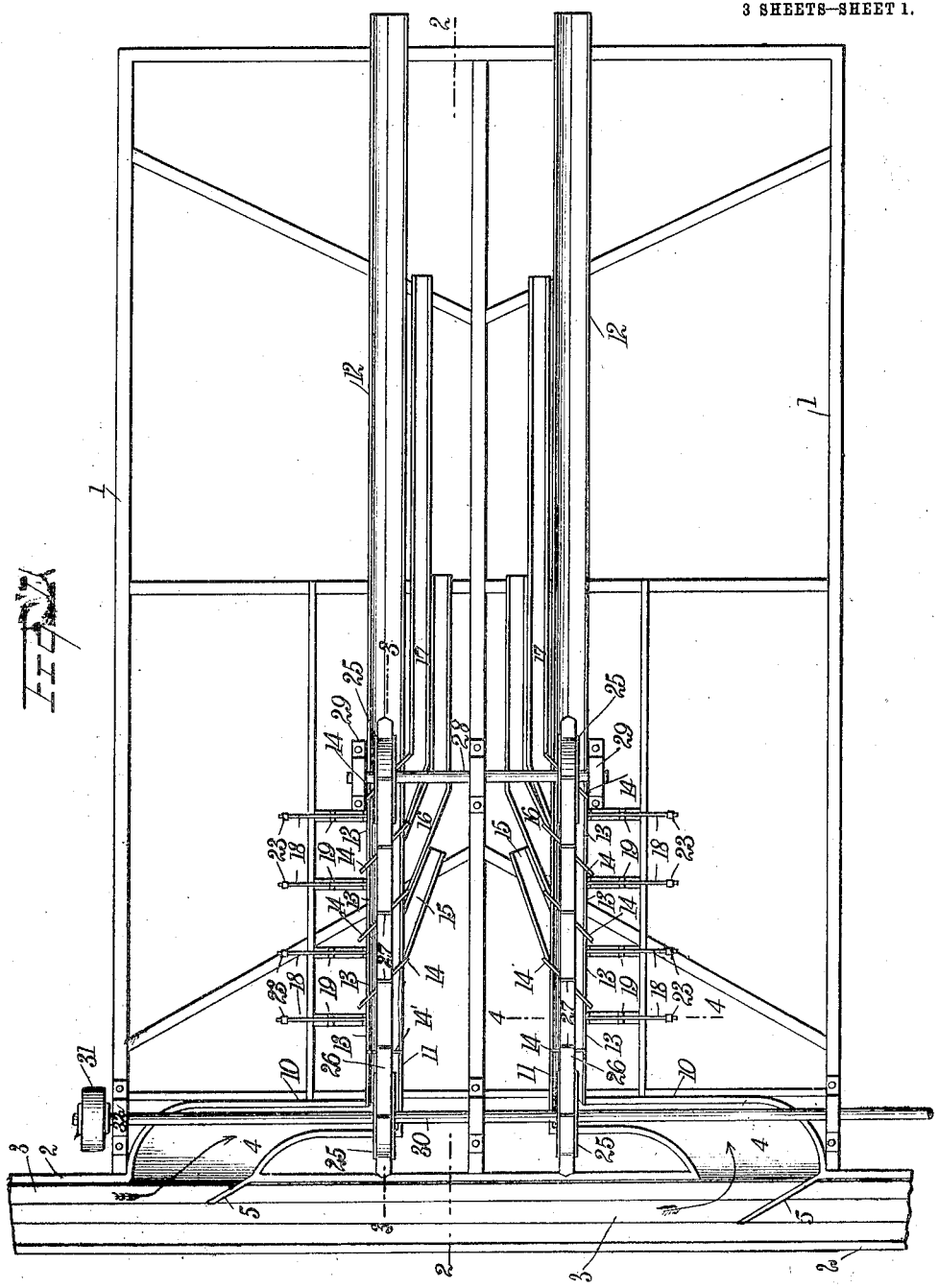
WITNESSES
H. T. Walker
Wm. F. Nickel
INVENTOR
Robert H. Peacock
BY Munn & Co.
ATTORNEYS

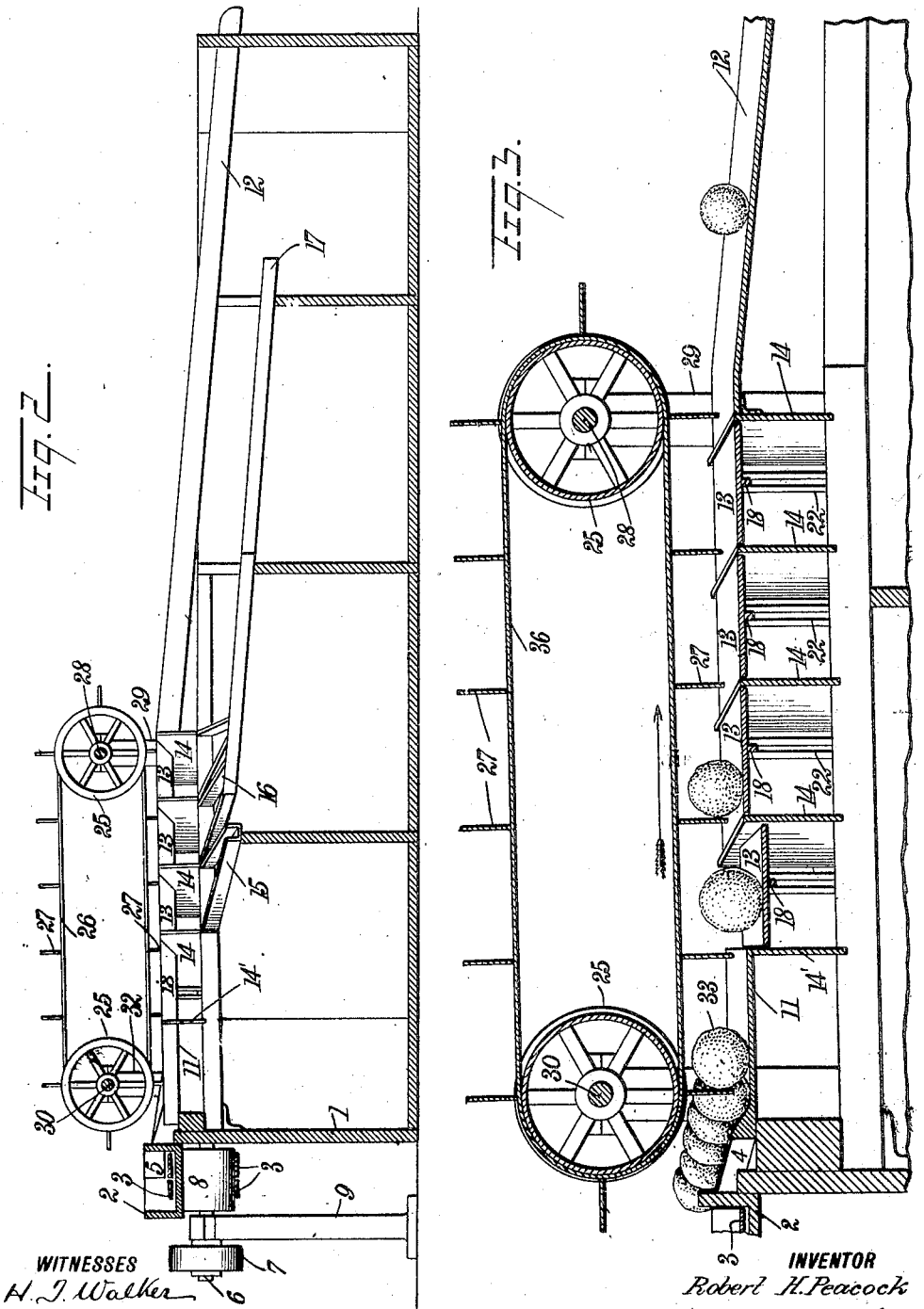

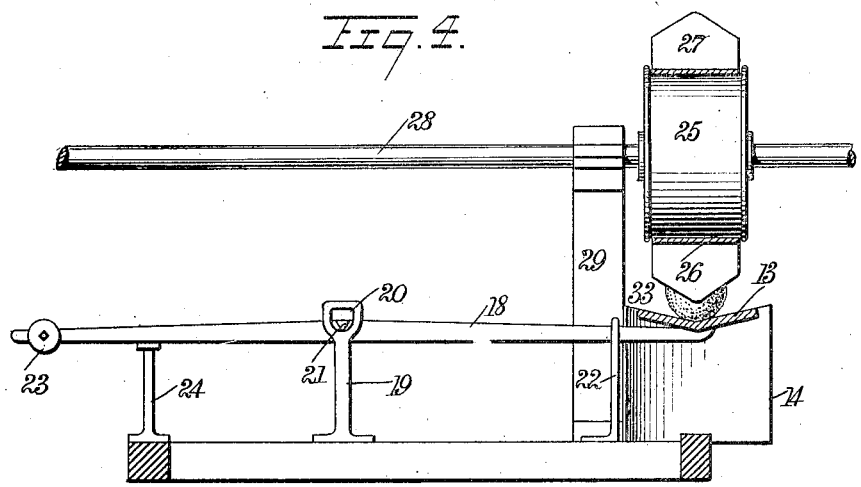
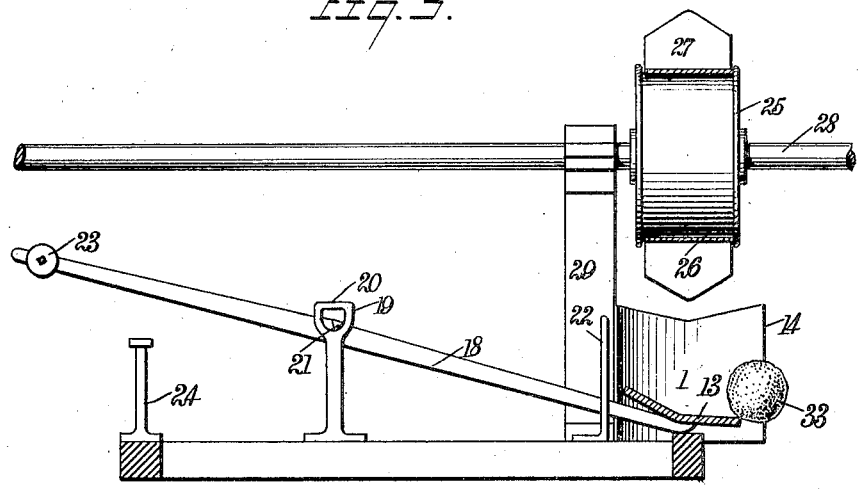
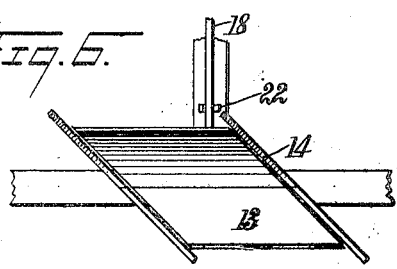

UNITED STATES PATENT OFFICE.

ROBERT H. PEACOCK, OF WINTERHAVEN, FLORIDA.

FRUIT-GRADING APPARATUS.

1,076,642.

Specification of Letters Patent. Patented Oct. 21, 1913.

Application filed January 19, 1912. Serial No. 672,033.

*To all whom it may concern:*

Be it known that I, ROBERT H. PEACOCK, a citizen of the United States, and a resident of Winterhaven, in the county of Polk and State of Florida, have invented a new and Improved Fruit-Grading Apparatus, of which the following is a full, clear, and exact description.

My invention relates to apparatus for grading fruit, and particularly fruits of a certain class, such as oranges, the quality of which is determined by the amount of juice which the fruit contains.

It is well known that oranges of one size contain more juice and have thinner skins if they are heavy than if they are light, and, further, that a heavy orange contains richer juice as a general thing than a light orange, other things being the same. With these differences in mind I have constructed a fruit handling machine in which the oranges are graded after being sized, according to the weight thereof, and distributed in bins preparatory to packing and shipping them to market.

Reference is to be had to the accompanying drawings forming a part of this specification, in which the same characters of reference indicate the same parts in all the views.

Figure 1 is a top plan of a section of a packing house comprising a number of bins and the grading apparatus used in connection therewith; Fig. 2 is a longitudinal section on the line 2—2 of Fig. 1; Fig. 3 is a longitudinal section on the line 3—3 of Fig. 1; Fig. 4 is a vertical transverse section on the line 4—4 of Fig. 1; Fig. 5 is a similar section, showing the parts in a different operating position; and Fig. 6 is a top plan of one of the scale pans which is operated by the weight of the orange passing over the same, to be tilted.

Although the qualities of good oranges are well known, it has been very difficult heretofore to sort the fruit properly before sending the same to market, because hand labor and the judgment of the packers have generally been relied upon to do this sort of work. Such methods have necessarily proven to be unsatisfactory because each grower would have his fruit sorted according to his own ideas of the quality of his crop, or rather the ideas of his manager and the men under the manager's direction. Hence, fruit shipped from a certain section and reported to be of a certain standard or quality will necessarily vary widely within certain limits, and it is with such conditions in mind that I have devised an automatic fruit grading device which will operate to sort out the fruit according to an unvarying and uniform standard of weight and quality.

Referring particularly to the drawings, I employ a packing house which is divided into a number of sections arranged on either side of the longitudinal center line thereof. A pair of such sections or compartments is indicated by the numeral 1 on the drawings, and the inner end of each section or compartment is located in proximity to a trough 2, in which move conveyer belts 3, this trough extending across the ends of the compartments or sections 1; and each of the compartments has a spout or chute 4, which extends from one side of the trough to deliver to the compartment the fruit to be graded. The outer end of each of these chutes has a baffle-plate 5 projecting therefrom in a diagonal direction with reference to the trough 2, these baffle-plates being of unequal lengths, one of them operating to deflect fruit or other articles to be graded on one of the belts 3 into one of the spouts 4, and the other operating to deflect the fruit or other articles carried by the other belt into the other chute 4. It will be seen by referring to Fig. 2, that the belts 3 are moved forward by means of a shaft 6 carrying a wheel 7 which receives the operating belts, and having a wheel 8 mounted thereon over which the belts pass. This wheel 8 and the shaft 6 may be located so as to engage the endless belts 3 at the end of the loops thereof, as will be readily understood.

The numeral 9 indicates a standard having a bearing at its top in which the shaft 6 is mounted, the other end of the shaft being carried in the side of a section 1, if desired.

Fruit or other articles to be graded are delivered to the belt 3 by means of a suitable sizer, one of the belts 3 carrying fruit of one size and the other belt 3 carrying fruit of a different size, the load borne by each belt to be graded according to the weight thereof in a manner hereinafter described. Of course I may use a single trough having only one belt therein for each compartment 1, or I may dispense with the trough entirely and deliver fruit of one size to each of the chutes 4 from the sizer direct. It is not material, however, which form of feeding means I employ, as the feeding means may be left to the choice or convenience of the packer. It is only necessary to have mechanism which will deliver oranges of one size to each chute 4 in each of the sections or compartments 1, to grade the fruit by weight after the crop has been divided into oranges of certain sizes, in the manner required.

Each of the discharge sprouts or chutes 4 is wider at its receiving end than at its delivery end, and is provided with a straight rear side 10, as shown in Fig. 1. The discharge end of each of these spouts 4 is shown at 11, and this discharge end projects at substantially a right angle from the rear side 10, and is in line with a trough 12 which passes through the outer wall of the compartment 1. Between the adjacent ends of the portions 11 of the sprouts 4 and the troughs 12 are arranged a number of scale pans 13, these scale pans 13 being separated from each other by means of diagonally-arranged partitions 14; and communicating with the space between each two of the diagonal partitions 14 are conduits through which the oranges roll to the bins into which each compartment is divided. It will be noted that at the adjacent end of each of the scale pans 13 which is nearest to the discharge end 11 of the spouts 4, I arrange partitions 14', which are not diagonal, but extend straight across the line along which the spouts 4 deliver, but otherwise this partition is the same in shape as the partitions 14 above mentioned. The conduits which extend to the bins into which each compartment is divided are indicated by the numerals 15, 16 and 17, and it will be seen by referring to Fig. 1, that each compartment contains four bins separated from one another by means of transverse partitions. Each of the conduits or spouts 15, 16 and 17 delivers into one of the bins of each compartment, but no conduit is necessary for the innermost bins or those nearest to the trough 2. These bins are filled from the scale pans adjacent the boards or partitions 14', and when they are depressed, the oranges drop directly into these innermost bins therefrom.

By referring to Figs. 4 and 5 it will be seen that the scale pans 13 are shaped in cross-section like a flattened V, and the upper edges of the partitions or boards 14 which occupy vertical positions between the pans 13, are correspondingly shaped. When the scale pans 13 are in horizontal position, these scale pans and the upper edges of the boards or partitions 14 and 14' make a smooth bridge over which the fruit can pass from the discharge portions 11 of each spout 4 to the adjacent end of each trough 12, if it be lacking in weight and of sufficiently low quality.

Each of the scale pans 13 is mounted upon a scale beam 18, which is supported adjacent its center upon two standards 19 having apertures 20 in their upper ends to receive knife-edge projections 21, extending outward from either side of the beam 18. Between the standards 19 and the scale pans 13 are guides 22, secured to the floor of the packing house and arranged somewhat in the shape of an inverted U, so that the beams will be prevented from moving laterally or tilting upward in front to raise the scale pans above the upper edges of the boards or partitions 14. The opposite ends of the beams carry weights 23, and these ends rest upon standards or supports 24. It will be understood that the weights 23 are of different mass, according to the conditions under which the fruit grading machine is operated.

Above each longitudinal row of scale pans 13 I mount a pair of pulleys 25, which operate a conveyer 26 carrying plates 27 projecting from the outer face thereof. The rear pulley 25 is mounted upon a spindle 28, carried in bearings on the upper ends of standards 29; and the front pulleys 25 are secured to a transverse shaft 30, mounted in bearings upon standards similar to those shown at 29, and having an operating pulley 31.

The manner in which the fruit grading apparatus works will now be apparent. Oranges of one size shown at 33, will be laid in the trough and carried forward by the conveyers 3 past the inner end of each section or compartment 1. As stated above, each belt will carry oranges of one size, and the oranges on each belt will be brought in position to be deflected in certain quantities into the spouts 4, which, as shown in Figs. 2 and 3, are inclined from the inlet end to the outer end, so that the fruit will roll down into the outlet section 11. This outlet section, as well as the body of the chute 4, will be open at the top, as shown in Fig. 3; and the inner pulleys 25 being located directly above each of the outlet sections 11 of the chutes 4, the oranges will be engaged by the plates 27, carried by the belts 26, and carried forward upon the scale pans 13. The weights on the ends of the beams 18 which support the scale pans 13 will be of different values, and they will preferably be adjusted so that the heaviest weight will be nearest the spouts 4, and the lightest weight farthest removed therefrom, with the weights in between of a value to correspond. As a consequence, a very heavy orange, the moment it passes upon one of the first pans 13, will overcome the weight and tilt the pan, to be dropped into one of the innermost bins in the compartment 1.

The next heaviest oranges will tilt the second scale beams and pass into the conduits 15, and so on, the lightest oranges passing as far as the last scale beams before they reach a weight of sufficient low mass to be overbalanced, whereupon these oranges will pass along the conduits or spouts 17 to the bins in the outer end of the section or compartment 1. Any fruit that is sufficiently lacking in weight and quality to pass over all the scale beams without overbalancing the weight one of them will be carried ahead until it reaches the troughs 12, which are inclined as shown in Figs. 2 and 3, and will be allowed to roll down and out into baskets or boxes placed along the packing house outside of the same, and receive them. Each of the oranges 33 is readily delivered the moment it begins to tilt one of the pans 13. This is because, as soon as the scale pan 13 is depressed, the plate 27 will push the orange therein against the diagonal surface of the board or partition 13 adjacent the far edge of the scale pan. The orange will roll along the diagonal surface of this board or partition until it reaches the outer edge of the scale pan 13, being gently propelled by the plate 27 in contact therewith. This is because there will be a wedge-shaped space between the plane of the partition 14 in question and the plane of the plate 27, and the reaction of the partition or surface 14 against the orange when the same is pressed against the surface 14 by the plate 27, will act to force the orange outward until it rolls over the edge of the scale pan 13 and drops.

From the above description it will be seen that I have provided an efficient and valuable means for grading oranges and similar fruits according to the weight and quality thereof, and with a machine of this sort, all the variations in the quality of the fruit, due to errors of human judgment, are eliminated.

I wish to have it understood that I reserve to myself the right to make such changes in the shape, size and arrangement of the parts as fairly fall within the spirit and scope of my invention.

Having thus described my invention, I claim as new and desire to secure by Letters Patent:

1. Apparatus of the kind described comprising a receiving pan, means for balancing the same, means for delivering articles to be graded thereto, the receiving and discharge edges of said pan extending diagonally with respect to the line of movement of said articles, and a pair of partitions arranged adjacent said diagonally-extending edges, the tops of said partitions lying flush with the top surface of said pan when the pan is in its balanced position.

2. Apparatus of the kind described comprising a receiving pan, means for balancing the same, means for feeding articles to be graded to said pan, said means comprising a belt having projections extending from its face, the receiving and discharge edges of said pan extending diagonally with respect to the direction of motion of said belt and a pair of plates or partitions on either side of said pan and extending in the same direction as said diagonal edges, said plates or partitions having their top edges registering with the top surface of the pan when the same is balanced, whereby, when the pan is tilted, the article will be engaged by one of the projections carried by the belt, and the said article will be easily discharged from the pan.

In testimony whereof I have signed my name to this specification in the presence of two subscribing witnesses.

ROBERT H. PEACOCK.

Witnesses:
ILLIS E. SMITH,
W. M. HAMPTON.